United States Patent [19]
Lane et al.

[11] Patent Number: 5,304,360
[45] Date of Patent: Apr. 19, 1994

[54] PEROXOACID MANUFACTURE

[75] Inventors: John R. G. Lane, Liverpool; Colin F. McDonogh, Warrington; Stephen E. Woods, Wirral, all of England

[73] Assignee: Interox Chemicals Limited, London, United Kingdom

[21] Appl. No.: 769,803

[22] Filed: Oct. 2, 1991

[30] Foreign Application Priority Data

Oct. 27, 1990 [GB] United Kingdom ............... 9023433

[51] Int. Cl.⁵ ..................... C01B 17/98; C01B 17/48
[52] U.S. Cl. .................... 423/521; 422/161; 422/224; 422/256
[58] Field of Search ............ 422/161, 224, 256; 423/521

[56] References Cited

U.S. PATENT DOCUMENTS

| | | |
|---|---|---|
| 2,789,954 | 4/1957 | Fell. |
| 3,272,597 | 9/1966 | Beltz et al. ............ 422/224 |
| 3,743,598 | 7/1973 | Field ..................... 422/224 |
| 3,900,555 | 8/1975 | Jourdan-Laforte. |
| 3,939,072 | 2/1976 | Laforte. |
| 3,998,597 | 12/1976 | Forrest ................. 422/224 |
| 5,028,401 | 7/1991 | Escolar et al. ......... 422/224 |

FOREIGN PATENT DOCUMENTS

| | | |
|---|---|---|
| 738407 | 10/1955 | United Kingdom. |
| 844096 | 8/1960 | United Kingdom. |
| 1175514 | 12/1969 | United Kingdom ......... 422/224 |

*Primary Examiner*—Wayne Langel
*Attorney, Agent, or Firm*—Larson and Taylor

[57] ABSTRACT

Conventional plant to produce peroxomonosulphuric acid (Caro's acid) is large and emphasises extensive cooling, so that it is awkward to transport, can be cumbersome to install beside existing plant and can suffer from relatively expensive capital and/or running costs.

In the present invention, Caro's acid is generated continuously in relatively small plant adiabatically, by introducing concentrated hydrogen peroxide into a stream of concentrated sulphuric acid in a reaction chamber dimensioned so that the throughput is very fast. In particularly suitable embodiments, the reaction chamber is annular at the points of introduction of the reagents, its width being greater in the vicinity of the hydrogen peroxide inlet than in the vicinity of the sulphuric acid inlet. The hydrogen peroxide inlet is preferably angled backwardly so that its encounter angle with the sulphuric acid stream is over 90° to about 165°.

18 Claims, 1 Drawing Sheet

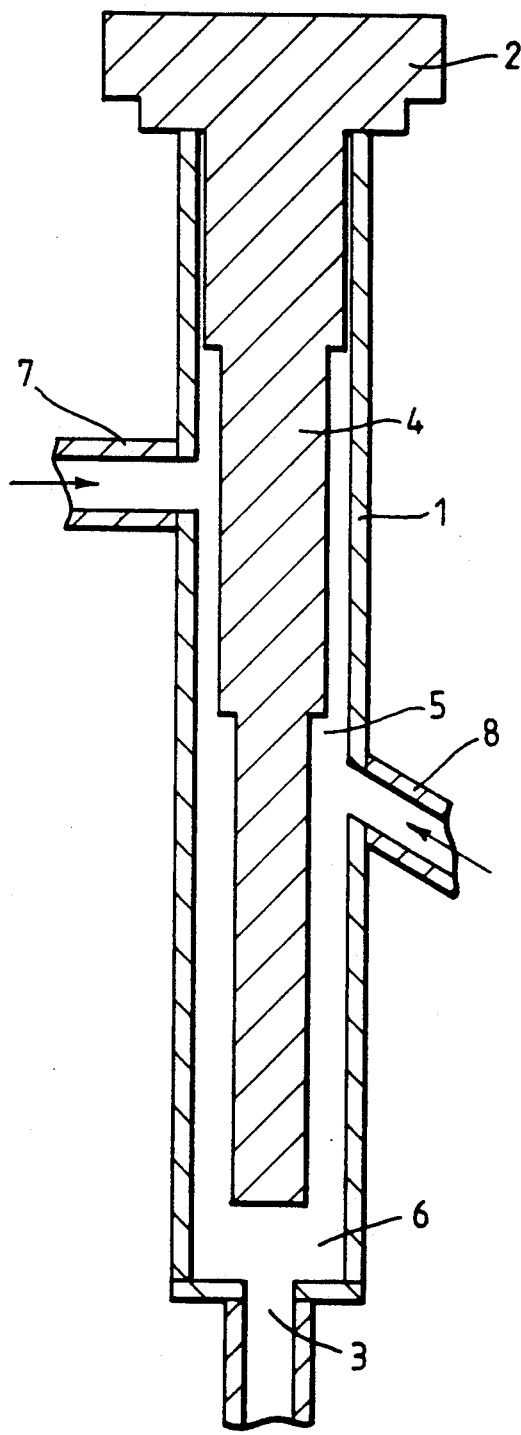

PEROXOACID MANUFACTURE

The present invention relates to peroxoacid manufacture and more particularly to a process and apparatus for the manufacture of peroxomonosulphuric acid.

Peroxomonosulphuric acid, which is sometimes referred to herein as Caro's Acid, has the formula $H_2SO_5$. It is a very powerful oxidising agent which can be employed in a wide range of industries, including for example in the metal extraction and processing industries, in chemical syntheses and for the rapid and effective detoxification of effluents containing amongst others, phenolic, cyanic, sulphidic and other oxidisable organic and inorganic species.

The scale of its use has been impeded by difficulties and cost of its manufacture, transportation and storage, which has meant in practice and for convenience that it is usually made at the same location as its intended place of use. It has also been recommended hitherto that it is used soon after its manufacture. There are two principal methods by which preparation of Caro's acid has been proposed. One method entails the partial hydrolysis at an elevated temperature, of peroxodisulphuric acid $H_2S_2O_8$ in aqueous acidic solution which in turn had been obtained by electrolysis or acidification of an alkali metal or ammonium perdisulphate salt. This route is suitable for bench scale preparations, but has found little favour at a larger scale. The second route comprises reaction between aqueous hydrogen peroxide and sulphuric acid, oleum or gaseous $SO_3$. For sulphuric acid the equation comprises:

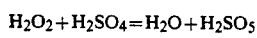

$$H_2O_2 + H_2SO_4 = H_2O + H_2SO_5$$

The second route has found greater favour because it employs starting materials that are widely available commercially. Emphasis has been placed upon the control of the reaction. Thus, for example, in GB-A-844 096, page 2 lines 28 to 42 E. I. Du Pont specifies a reaction temperature of up to 25° C., such as from 0° to 15° C., and explains that temperatures above 25° C. are not recommended since they are conducive to poor efficiencies due to hydrolysis of monopersulphuric acid and losses of active oxygen. The subsequent paragraph indicates that the oleum is added at a controlled rate to the hydrogen peroxide, with maintenance of agitation and cooling of the mixture. In consequence, the reaction vessel is complicated and is rendered more expensive to construct and operate and furthermore the production rate of such a process is severely curtailed by the cooling constraints.

In GB-A-738,407 and the corresponding U.S. Pat. No. 2,789,954 which was issued in 1957 and assigned to Stevensons (Dyers) Limited, in col 1 lines 42 to 49, there is decribed a process in which regulated amounts of hydrogen peroxide and concentrated sulphuric acid are mixed together under such conditions as to produce a mixture containing permonosulphuric acid, the mixture is cooled to inhibit any further reaction and then substantially immediatedly diluted with water. The patentee advocated that the flow be regulated such that the temperature of the mixture reaches at least about 50° C. and be cooled promptly thereafter, for example by mixing the reactants in the mouth of a water cooled condenser or actually within the cooling zone of a water-jacketed condenser. It is apparent to the reader that promp and enforced cooling represents an essential element of their process, both in concept and practice.

In addition, the overall process contemplated in the patent is cumbersome and in practice involved double cooling.

More recently, Air Liquide in U.S. Pat. No. 3,900,555 and U.S. Pat. No. 3,939,072, which were issued in 1975/76, asserted that there was a need for a reactor that could produce monoperoxysulphuric acid at the moment of use and exemplified for that purpose a constant level double jacketed vessel with overfow means to deliver product out of the generator assembly and two symmetrically disposed reagent inlet pipes. Cooling water was circulated through the jacket. In the apparatus exemplified, the maximum hourly rate of production of the permonosulphuric acid solution was only 10 times the volume of fluid in the reaction vessel, presumably constrained by capability of the cooling jacket to prevent the reaction temperature from exceeding an upper limit. Of course, scale-up from the laboratory size apparatus exemplified by Air Liquide to a commercial size, though theoretically feasible, would be expected either to retard the production rate further because the surface area to volume ratio (and hence the cooling rate) varies inversely to the radius of a sphere or cylinder or to require the introduction of compensatory complications to the apparatus. Thus, the Air Liquide apparatus suffers from being relatively complex and from having a relatively small production capacity so that in consequence it suffers from comparatively expensive capital and/or running costs.

It was recognised by the instant inventors that the exploitation of Caro's acid for various oxidations was hindered by the capital and running costs of conventional units for its production. In addition, many of the sites at which Caro's acid would be potentially useful were located in remote places. For other potential uses, the Caro's acid is intended for modifying existing chemical or hydrometallurgical processes or treating wastes produced in such processes, so that any apparatus installed for generating Caro's acid would have to be fitted in beside existing plant. In both situations, the size of the apparatus to deliver a given volume of oxidant is of practical significance.

Accordingly, a programme was set in hand to devise a more cost-effective process and to design equipment that could be relatively convenient to transport to and use in a wide range of locations and preferably would also be relatively simple and robust.

The instant inventors also recognised that any process and apparatus would need to take into account the fact that the reaction producing permonosulphuric acid is exothermic, and that if the reagents are introduced into a reservoir of product, the heat generated can be distributed throughout the reservoir, so that the increase in temperature of the reaction mixture arising from introduction of a unit amount of reagents is proportionately reduced. Thus, any reduction in the size of the reservoir would accelerate the potential increase in temperature of the resultant mixture, which consequently would also enhance the likelihood of hydrogen peroxide decomposing, because the rate of the latter reaction is temperature dependent, but would significantly increase the risk of self-accelerating decomposition occuring because the peroxide decomposition reaction is itself strongly exothermic. This is not only wasteful of reagents, but the resultant forced ejection of very hot Caro's acid solution, for example in the form of a spray, would be particularly hazardous for any one in the vicinity. Thus, based on normal considerations of safety they were aware of a reasonable and soundly based prejudice in favour of apparatus that stressed the cooling and control of the reaction mixture, such as is described in the Air Liquide constant volume generator and control and likewise a prejudice against apparatus having such a through-put as to jeopardise cooling control.

According to one aspect of the present invention there is provided a continuous process for manufacturing peroxomonosulphuric acid by reaction between concentrated sulphuric acid and concentrated hydrogen peroxide which is characterised by introducing the two reagents under pressure into a closed tubular reaction chamber having an inlet for the sulphuric acid solution at or adjacent to one end, an outlet for the reaction mixture at the end that is distant from the sulphuric acid inlet and an inlet for the hydrogen peroxide solution that is positioned intermediate between the sulphuric acid inlet and the reaction mixture outlet whereby the hydrogen peroxide solution is introduced into a flow of sulphuric acid solution, said reaction chamber being so dimensioned relative to the flow rates of the reagents that the through-put per minute is at least about 20 times its internal volume measured between the inlet for the hydrogen peroxide solution and the outlet.

According to a second and closely related aspect of the present invention there is also provided apparatus suitable for manufacturing peroxomonosulphuric acid by reaction between concentrated sulphuric acid and concentrated hydrogen peroxide which is characterised by a closed tubular reaction chamber having an inlet for the sulphuric acid solution at or adjacent to one end, an outlet for the reaction mixture at the end that is distant from the sulphuric acid inlet and an inlet suitable for the hydrogen peroxide solution that is positioned intermediate between the sulphuric acid inlet and the reaction mixture outlet whereby the hydrogen peroxide solution in operation is introduced into a flow of sulphuric acid solution, said reaction chamber being so dimensioned relative to the flow rates of the reagents that the through-put per minute is at least about 20 times its internal volume measured between the inlet for the hydrogen peroxide solution and the outlet.

The sole Figure of the Drawing shows a longitudinal cross section of the apparatus employed in carrying out the process of the present invention.

It will be recognised that apparatus employed in the instant invention process does not employ any cooling means around the reaction chamber with the result that the reaction occurs adiabatically, the temperature of the reaction mixture being substantially higher than ambient and reaching an equilibrium point that remains reasonably constant whilst the reagents are being fed into the chamber, but the actual level of the temperature being determined primarily by the compositions of the sulphuric acid and hydrogen peroxide reagents and their relative rates of introduction. The equilibrium temperature attained within the chamber appears to vary in accordance with the concentration of peroxomonosulphuric acid obtained in the product, and that in turn tends to increase both with increasing total concentration of both reagents and also as their mole ratio approaches 1:1.

One of the important characteristics of the invention apparatus and process is the order of introduction of the two reagents into the reaction chamber. It has been found that there is a significant difference in the effect if the reagents are introduced in the reverse order. When aqueous hydrogen peroxide is introduced into a stream of sulphuric acid in accordance with invention, an equilibrium mixture of Caro's acid is formed very quickly. On the other hand, in trials of the reverse procedure, each time when the same concentrated sulphuric acid was introduced into a flowing stream of the same aqueous hydrogen peroxide solution in the same apparatus and under otherwise identical operating conditions, the result was startlingly and consistently unacceptable. The temperature of the reaction mixture rose within a few seconds beyond the anticipated equilibrium temperature to that at which partial vapourisation of the reaction mixture was observed. Pressure built up in the reaction vessel and the forced ejection of steam and very hot fluid from the vessel occurred. The trial was brought as quickly as possible to a halt by stopping the inflow of the reagents. It was deduced from the trials not only that there was a significant difference between the two modes of operation, when employing the closed adiabatic reaction chamber of the present invention, but also that the workable mode of operation of the instant invention is the opposite of the preferred mode of operation disclosed by Du Pont in GB-A-844096.

It will be understood that the instant invention employs apparatus in which the reaction chamber is closed, that is to say is not vented to the atmosphere. This means that the only escape for the reaction mixture is through the outlet port and in consequence it is of practical importance to control the rate of inflow of the reagents in the range identified above so as to avoid, or at least keep within reasonable bounds, the increased peroxygen decomposition that would arise if the through-put were permitted to drop below the minimum limit.

In a further aspect of the present invention, apparatus for the continuous generation of Caro's acid solution comprises a tubular reaction chamber having an inlet for the sulphuric acid solution at or adjacent to one end, an outlet for the reaction mixture at the end that is distant from the inlet and a transverely pointing inlet for the hydrogen peroxide solution that is positioned intermediate between the sulphuric acid inlet and the outlet, said reaction chamber comprising an annular zone extending longitudinally in the vicinity of the hydrogen peroxide inlet of the reagents, whereby in operation hydrogen peroxide solution introduced through its inlet is directed transversely to sulphuric acid solution flowing longitudinally through the annular zone towards the reaction mixture outlet.

In one particularly suitable design of the reaction chamber, the width of the annular zone, which herein means the difference between the internal and external radii of the circles defining the zone, increases at or just prior to the hydrogen peroxide inlet. The increase can conveniently be step-wise or gradual. In some especially preferred embodiments, the increase in width of the zone is such that the linear velocity of the fluid flowing within the annular zone of the reaction chamber towards the outlet is similar for the solely sulphuric acid flow and for the flow of sulphuric acid/hydrogen peroxide mixture. In practice, the annular zone in the vicinity of the sulphuric acid inlet is preferably narrow, that is to say the ratio of the former to the latter preferably being between about 0.75 to 1 to about 0.9:1. As a consequence, the sulphuric acid solution flows through the annular zone at a comparatively high rate towards the outlet. This assists mixing of the sulphuric acid solution with the hydrogen peroxide solution when the latter is subsequently introduced into the reaction chamber. In the vicinity of the hydrogen peroxide inlet and extending towards the outlet, the width of the annular zone is conveniently selected from ratios of internal to external radii in the range of from about 0.5:1 to about 0.8:1. The reaction chamber preferably is cylindrical or frusto-conical in the vicinity of the outlet.

Desirably, the reaction chamber has an overall length, as measured from the sulphuric acid inlet port to the outlet that is substantially greater than its transverse diameter, such as in the range of at least 3:1 and conveniently from about 4:1 to about 10:1.

An annular chamber can be achieved in an elegant and robust way by inserting a suitably shaped and dimensioned mandrel coaxially within a cylindrical reaction vessel. By decreasing the diameter of the mandrel as it approaches the outlet end, the cross-section of the annulus is increased. The mandrel may carry longitudinal or helical ribs extending partially into the annular space. In order to simplify the construction of the apparatus, increase its robustness and minimise the risk of leakage from the reaction chamber at seals, it is highly advantageous to employ a stationary mandrel. Alternatively, though un-necessarily, the mandrel may be rotatable about its longitudinal axis. If a rotating mandrel is employed it is particularly desirable for the width of the annular zone to be extremely narrow in the region between the sulphuric acid inlet and its adjacent end, so as to minimise any interaction between the sulphuric acid and the seal between the mandrel and the outer wall of the chamber.

It will be recognised that a similar stepped annular zone can be achieved by varying the bore diameter that defines the outer wall of the annular zone in conjunction with a mandrel of constant diameter, or as a further option, the diameters of both the mandrel and the bore can be varied.

The flows of reagents through the inlets are desirably pulseless and are often directed transversely into the reaction chamber, i.e. substantially at right angles to the longitudinal axis of the reaction chamber. Each inlet port may be offset slightly around the circumference of the reaction chamber or angled slightly relative to a geometrically true radial direction so as to direct the flow into the annular chamber. The two inlets may be disposed at any relative angle to each other, when viewed along the longitudinal axis of the chamber, but in especially convenient embodiments, the inlets are opposed.

In some preferred embodiments, it is desirable to incline the inlet for the hydrogen peroxide backwardly, i.e. away from the outlet, for example such that the encounter angle with the stream of sulphuric acid is obtuse and desirably falls in the range of at least about 90° to about 165°, and conveniently in the range of about 95° to 125°. Further convenient encounter angles are about 135° and 150°. By so angling the inlet for the hydrogen peroxide solution, the two solutions are somewhat opposed, rather than the one solution meeting the other tranversely, and it is believed that this mode encourages mixing of the solutions and discourages the presence of "dead spots" which could promote decomposition of the peroxy species that are present.

The outlet port preferably has a cross sectional area less than the area of the reaction vessel adjacent thereto, so that back pressure is created. This regulates the rate of flow of fluids out of the chamber in conjunction with the pressure on the pumped reagents and hence the through-put. It desirably comprises a non-return valve.

The reaction chamber is usually and preferably mounted with the inlets higher than the outlet. In practical and convenient embodiments, the mounting is often approximately vertical. It is often most convenient to mount the reaction chamber approximately vertically and/or directly above the liquid level in the vessel in which the Caro's acid is intended to be employed, so that the reaction mixture can flow directly out of the chamber into a treatment area.

The flow rate of the reagents into the reactor is preferably controlled in conjunction with the volume of the reactor and the size of its outlet so that the temperature of the mixture is able to attain its equilibrium temperature whilst it is still within the reactor. The maximum flow rates will be dependent to some extent upon the composition of the reagents and the mole ratio at which they are employed and hence the equilibrium temperature attainable therein. In many instances, the maximum flow rate of product per minute falls within the range of approximately 40 to 80 reactor volumes.

By adopting apparatus in accordance with the instant invention, it is possible to produce a large volume of Caro's acid safely without having to employ a large size generator. For example, a reaction chamber of only 20 mls total volume, but with a through-put of 30 volumes per minute can generate nearly 1.3 tonnes of product per day, if operated constantly, and at 80 volumes per minute can generate about 3.5 tonnes of product per day. Similarly, a chamber having a volume of a coffee cup, i.e. about 250 ml, can produce about 16 tonnes to 40 tonnes of product per day if operated with the same residence time arising from 30 to 80 volumes per minute throughput. The proportion of $H_2SO_5$ in the product depends, as would be expected, on the concentrations of the sulphuric acid and hydrogen peroxide reagents employed, and on their relative mole ratio. It will be recognised that apparatus of such size can be readily transported and is easily accomodated, even within very restricted working areas. It will also be recognised that the reactor can be controlled so as to deliver product within a wide range of demand. Where an even wider range of demand is contemplated, it is possible to employ two or more reactors in parallel with appropriate controls to regulate the reagents flows to one or more of the reactors as is required at any instant.

The adiabatic generator is desirably constructed from materials that are resistant to attack by the reagents and the product. In particular, certain fluorocarbon polymers such as PTFE, FEP and PFA are well suited in that they combine the qualities of robustness with chemical resistance. Other materials worthy of consideration include tantalum.

The relatively large through-put in the instant invention is not only advantageous, but it is an essential feature during the operation of the invention process. If the through-put were to be reduced significantly, the residence time of material in the reaction chamber would correspondingly increase, and the result would not be the simple reduction of the amount of product obtained, but instead the inherent safety of the process would be jeopardised and/or the amount of peroxygen product would be significantly curtailed. This is because the reaction mixture would be allowed to remain within the confined reaction chamber for an excessive period of time at the elevated temperatures that are obtained when concentrated sulphuric acid and hydrogen peroxide are permitted to react adiabatically. By controlling the throughput in the confined reaction chamber, it is possible to attain the equilibrium concentration of permonosulphuric acid in the reaction mixture without suffering from excessive decomposition of the residual hydrogen peroxide thus without the concomitant build up of pressure from gas generation.

The invention process is suitable for reaction between concentrated sulphuric acid and aqueous hydrogen peroxide in which the mole ratio of sulphuric acid to hydrogen peroxide is selected in the range of from 0.5:1 to 5:1, and is particularly suitable when the mole ratio is within the range of from 1:1 to 3:1. The concentration of sulphuric acid is normally at least 90% w/w and often from 92 to 99% w/w. The concentration of hydrogen peroxide employed is normally at least 50% and especially from 60% up to 75% w/w. In a number of very useful instances, the total amount of water introduced in the two reagents represents 25 to 40 mole % based upon the total moles of water plus hydrogen peroxide plus sulphuric acid.

The temperature reached within the reaction chamber in many instances excedes 80° C., but preferably the reactants are so chosen that the effluent temperature of the product does not excede 110° C. Such a temperature range represents that at which the invention process can be employed most effectively, It is desirable to monitor the temperature, for example in the effluent product and arrange for introduction of the reagents to be halted if the temperature progresses too high. To at least some extent, the temperature attained at a given sulphuric acid:hydrogen peroxide mole ratio can be varied by inversely varying the amount of water employed, for example by varying the concentration of hydrogen peroxide feedstock. It is especially preferred to select and control the reagents fed into the reactor such that the mixture attains a temperature of from about 85° to about 105° C.

The Caro's acid solution produced in the present invention is available for instant use. The size of the reactor relative to the rate of production means also that a response to a demand for oxidant can be extremely rapid. Where the demand is lower than the minimum flow rate for safe operation of the reactor, then it can be operated intermittently, or alternatively or additionally, to at least some extent, the volume of the reaction chamber may be reduced by employing a larger mandrel, coupled with the same or similar residence time.

In one especially advantageous set of embodiments, the product is allowed to flow directly, for example under the influence of gravity, into the tank or other vessel in which its use is desired without passing through any cooling means. The high rate of flow of the product and the proximity of the adiabatic reactor to the treatment tank means that the delay between its manufacture and incorporation in the treatment tank is normally very short. Alternatively, and in a further set of advantageous embodiments, the product can be allowed to flow through a pipe located within the treatment tank and covered by the liquid therein so that the product is cooled by heat exchange through the walls of the pipe.

If desired, the Caro's acid product produced in the generator according to the present invention may be passed through a dedicated cooling unit, if, for example it is desired to store the product rather than use it instantly, and in such circumstances, it is preferable to effect sufficient cooling to lower the temperature of the product to below about 60° C. to improve its storage stability. It will be recognised that if the temperature reached in the adiabatic generator is about 90° C., then this requires rather less than half the heat removal compared with maintenance of a steady state temperature in a reactor pot of about 30° C. or lower. Secondly, the temperature difference is usually on average about 60°-70° C. between the product from the adiabatic generator and the cooling water invention generator whereas the temperature difference between a steady state pot at 30° C. and the same cooling water is 15° to 25° C., i.e. less than half. This means that the size of any heat exchanger employed need only be a fraction, e.g. ¼ to 1/5th that needed for the same through-put using steady state pot method of making Caro's acid.

The Caro's acid product obtained in the invention process can be employed for the range of many uses described for product obtained by other processes. Thus, it can be employed for treatment of effluents containing oxidisable impurities or in the extraction or processing of metals or in purification or in chemical synthesis.

Having described the present invention in a general manner, one embodiment thereof will now be described in greater detail, by way of example only with reference to the Figure which shows a longitudinal cross section of the apparatus.

The apparatus comprises a hollow PTFE cylinder 1 of internal diameter 20 mm and length 150 mm which is closed at one end by a cap 2 and at its other end by a non-return valve 3 acting as outlet. A stepped PTFE mandrel 4 extends co-axially inside cylinder 1 from cap 2, the first step of 28 mm length having a diameter of 19 mm, the second step of 48 mm length having a diameter of 16 mm and the third step of 64 mm length having a diameter of, 12 mm. Mandrel 4 defines with the inner surface of the cylinder 1 a stepped annular reaction chamber 5 that terminates in a short cylindrical chamber 6 close to non-return valve 3. The cylinder 1 is provided with an upper inlet port 7 for sulphuric acid pointing radially and perpendicularly towards the second step of the mandrel 4 and a lower inlet port 8 for hydrogen peroxide that points radially but backwardly at an angle of 60° to the longitudinal axis towards the third step of mandrel 4.

In operation, sulphuric acid is pumped into the annular chamber 5 and forms a stream flowing towards the non-return valve 3. Hydrogen peroxide is simultaneously pumped into the annular chamber 5 and encounters the stream of sulphuric acid substantially at an angle of about 120°. The two liquids continue to mix together in chamber 6 and the mixture flows out through valve 3.

EXAMPLE 1

In this Example, concentrated sulphuric acid (98% w/w) and hydrogen peroxide (70% w/w) solutions were pumped into the apparatus described hereinbefore with reference to the Figure at flow rates of respectively 260 ml/min and 56 ml/min, providing a mole ratio of $H_2SO_4:H_2O_2$ of 3.224. The mixture attained a temperature of 86° C. and contained 28.56% w/w peroxomonosulphuric acid ($H_2SO_5$) and 0.73% w/w $H_2O_2$.

EXAMPLE 2

In this Example, Example 1 was followed, except that the flow rates of sulphuric acid and hydrogen peroxide were respectively 360 ml/min and 43.8 ml/min, providing a mole ratio of $H_2SO_4:H_2O_2$ of 5.715. The mixture attained a temperature of 63° C. and contained 16.9% w/w peroxomonosulphuric acid ($H_2SO_5$) and 0.24% w/w $H_2O_2$.

EXAMPLE 3

In this Example, Example 1 was followed, except that the flow rates of sulphuric acid and hydrogen peroxide were respectively 210 ml/min and 148.8 ml/min, providing a mole ratio of $H_2SO_4:H_2O_2$ of 0.980. The mixture attained a temperature of 104° C. and contained 39.4% w/w peroxomonosulphuric acid ($H_2SO_5$) and 10.3% w/w $H_2O_2$.

EXAMPLE 4

In this Example, Example 1 was followed, except that the flow rates of sulphuric acid and hydrogen peroxide were respectively 220 ml/min and 92.8 ml/min, providing a mole ratio of $H_2SO_4:H_2O_2$ of 1.647. The mixture attained a temperature of 108° C. and contained 43.05% w/w peroxomonosulphuric acid ($H_2SO_5$) and 4.5% w/w $H_2O_2$.

We claim:

1. A continuous process for manufacturing peroxomonosulphuric acid by reaction between concentrated sulphuric acid and concentrated hydrogen peroxide which is characterised by introducing the acid and peroxide under pressure into a closed tubular reaction chamber having an inlet for the sulphuric acid solution at or adjacent to one end, an outlet for the reaction mixture at the end that is distant from the sulphuric acid inlet and an inlet for the hydrogen peroxide solution that is positioned intermediate between the sulphuric acid inlet and the reaction mixture outlet whereby the hydrogen peroxide solution is introduced into a flow of sulphuric acid solution, said reaction chamber being so dimensioned relative to the flow rates of the acid and peroxide that the through-put per minute is at least about 20 times its internal volume measured between the inlet for the hydrogen peroxide solution and the outlet.

2. A process according to claim 9 wherein the hydrogen peroxide is introduced into the stream of sulphuric acid flowing towards the outlet at an encounter angle having a counter-current component.

3. A process according to claim 2 wherein the encounter angle between the hydrogen peroxide and stream of sulphuric acid is between 95° and 165°.

4. A process according to claim 1 wherein the through put is about 40 to 80 times its internal volume per minute.

5. A process according to claim 1 wherein the mole ratio of sulphuric acid to hydrogen peroxide is selected in the range of from 0.5:1 to 5:1.

6. A process according to claim 1 or 5 wherein the concentration of sulphuric acid solution is from 92 to 99% w/w and the concentration of hydrogen peroxide solution is from 60 to 75% w/w.

7. A process according to claim 1 wherein the total amount of water introduced in the acid and peroxide is from 25 to 40 mole %.

8. A process according to claim 9 wherein the annular zone of the reaction chamber into which sulphuric acid and hydrogen peroxide is introduced is formed by insertion of a stationary mandrel inside a cylindrical chamber.

9. A process according to claim 1 wherein the tubular reaction chamber comprises an annular zone extending longitudinally in the vicinity of the hydrogen peroxide inlet.

10. A process according to claim 9 further comprising introducing the hydrogen peroxide solution through a transversely pointing inlet into the sulphuric acid solution which is flowing longitudinally through the annular zone towards the reaction mixture outlet.

11. A process according to claim 9 wherein the reaction chamber comprises an annular zone having a relatively narrow width in the vicinity of the sulphuric acid inlet and a relatively wider width in the vicinity of the hydrogen peroxide inlet.

12. A process according to claim 1 wherein the reaction mixture attains a temperature in the range of from about 85° to about 105° C.

13. Apparatus for the continuous generation of Caro's acid solution comprising a tubular reaction chamber having an inlet for a sulphuric acid solution at or adjacent to one end, an outlet for a reaction mixture at the end that is distant from the inlet and a transversely pointing inlet for a hydrogen peroxide solution that is positioned intermediate between the sulphuric acid inlet and the outlet, said reaction chamber comprising an annular zone extending longitudinally in the vicinity of the hydrogen peroxide inlet of the reagents, whereby in operation hydrogen peroxide solution introduced through its inlet is directed transversely to sulphuric acid solution flowing longitudinally through the annular zone towards the reaction mixture outlet, said reaction chamber having a relatively narrow width in the vicinity of the sulphuric acid inlet and relatively wide width in the vicinity of the hydrogen peroxide inlet.

14. Apparatus for the continuous generation of Caro's acid solution comprises a tubular reaction chamber having an inlet for a sulphuric acid solution at or adjacent to one end, an outlet for a reaction mixture at the end that is distant from the inlet and a transversely pointing inlet for a hydrogen peroxide solution that is positioned intermediate between the sulphuric acid inlet and the reaction mixture outlet, said reaction chamber comprising an annular zone extending longitudinally in the vicinity of the hydrogen peroxide inlet, whereby in operation hydrogen peroxide solution introduced through its inlet is directed transversely to sulphuric acid solution flowing longitudinally through the annular zone towards the reaction mixture outlet, the annular zone of the reaction chamber being formed by insertion of a mandrel inside a cylindrical chamber.

15. Apparatus according to claim 14 wherein said mandrel is stationary.

16. Apparatus according to claim 13 or claim 14 wherein the reaction chamber comprises an annular zone in the vicinity of the reagent inlets and a cylindrical zone in the vicinity of the outlet.

17. Apparatus according to claim 13 or 14 wherein the hydrogen peroxide inlet is angled backwardly into the stream of sulphuric acid flowing towards the outlet.

18. Apparatus according to claim 17 wherein the encounter angle between the hydrogen peroxide and stream of sulphuric acid is between 95° and 165°.

* * * * *

UNITED STATES PATENT AND TRADEMARK OFFICE
CERTIFICATE OF CORRECTION

PATENT NO. : 5,304,360
DATED : April 19, 1994
INVENTOR(S) : LANE et al.

It is certified that error appears in the above-identified patent and that said Letters Patent is hereby corrected as shown below:

Column 9:
Claim 2, line 1, delete "claim 9" and insert --claim 1--.

Signed and Sealed this

Sixth Day of September, 1994

Attest:

BRUCE LEHMAN

Attesting Officer          Commissioner of Patents and Trademarks